(12) United States Patent
Ueda

(10) Patent No.: US 6,208,334 B1
(45) Date of Patent: *Mar. 27, 2001

(54) TEXT READING APPARATUS, TEXT READING METHOD AND COMPUTER-READABLE MEDIUM STORING TEXT READING PROGRAM

(75) Inventor: Hiroaki Ueda, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,617

(22) Filed: Apr. 9, 1997

(30) Foreign Application Priority Data

Apr. 12, 1996 (JP) .................................... 8-090707

(51) Int. Cl.[7] ..................................... G06F 15/00
(52) U.S. Cl. ........................................... 345/302; 704/200
(58) Field of Search .................................. 345/302, 438, 345/112, 141, 468, 469, 116, 115; 704/2, 200, 203, 251, 258; 707/541, 531, 529, 526

(56) References Cited

U.S. PATENT DOCUMENTS

| 4,695,962 | * | 9/1987 | Goudie | 364/513.5 |
| 4,742,516 | * | 5/1988 | Yamaguchi | 370/94 |
| 5,752,228 | * | 5/1998 | Yumura et al. | 704/260 |
| 5,802,534 | * | 9/1998 | Hatayama et al. | 707/630 |

FOREIGN PATENT DOCUMENTS

| 61-84689 | 4/1986 | (JP) . |
| 3-293398 | 12/1991 | (JP) . |
| 5-113795 | 5/1993 | (JP) . |
| 6-19433 | 1/1994 | (JP) . |

* cited by examiner

Primary Examiner—Hosain T. Alam
Assistant Examiner—Alford W. Kindred
(74) Attorney, Agent, or Firm—Young & Thompson

(57) ABSTRACT

A plurality of display control portions display multiple text sets simultaneously on a display screen. Meanwhile, only one reading portion converts a text set into voice to be read out. When the reading portion is not reading out the text set, a request for changing a selected text set is accepted, and when it is reading out the text set, such a request is rejected. Further, the title of the text set which is selected to be read out is displayed on the display. Since only one reading portion is provided, the exclusive control for reading out the text set can be facilitated. In addition, it is possible to easily identify which text set among multiple text sets is read out because the title of the work which is currently read out is displayed.

11 Claims, 12 Drawing Sheets

TEXT READING APPARATUS, TEXT READING METHOD AND COMPUTER-READABLE MEDIUM STORING TEXT READING PROGRAM

BACKGROUND OF THE INVENTION

1. Field of the Invention

The present invention relates to a text reading apparatus, a text reading method, and a computer-readable medium storing a text reading program for converting a text set displayed on a display screen into voice to be read out.

2. Description of the Related Art

In a text reading apparatus for converting a text set created by a document composition tool, such as a word processor, into voice to be read out, various improvements have been made in order to more naturally read out the text set.

Japanese Patent Application Laid-open No. 5-113795 discloses a text reading apparatus for reading a text set with a voice according to a user's preference. In this apparatus, parameter values such as vocalizing speed, voice tone and others can be selected by a user. Further, Japanese Patent Application Laid-open No. 3-293398 discloses a text reading apparatus that retrieves phonemes from a word dictionary and selects the appropriate pronunciation or accent in accordance with the meters of the surrounding words, when it converts the text set in Japanese into voice to be read out.

There is also a text reading apparatus for displaying the contents of a text set that is being read out on a display unit when converting the text set into voice to be read out.

FIG. 17 shows an outline of a structure of a conventional text reading apparatus that reads out a displayed text set. This apparatus includes a display 302 for displaying a work 301, a particular text set, stored in a storage memory such as a disk device and a display control portion 303 for controlling the output onto the display 302. A reading portion 304 for converting the work 301 into voice to be read out and a speaker 305 for outputting the converted voice are also provided.

The display control portion 303 is provided with a display operation control portion 311 for controlling the entire display control and a text formatting portion 312 for formatting a text set to be displayed so as to fit in a predetermined area of the display 302. There are also provided a font data storing portion 313 for storing dot data of each word and a dot data generating portion 314 for converting each word in the text set to be displayed into dot data.

The reading portion 304 includes a reading operation control portion 321 for controlling the entire reading control, a text analyzing portion 322 for analyzing the text data to be converted into pronunciation codes, and a word dictionary 323 storing words to which reference is made when analyzing the text data. The reading portion also has a voice data storing portion 324 for storing voice codes and voice waveforms in coordinating manner and a voice synthesizing portion 325 for converting voice codes into voice waveforms.

The work 301 is formatted by the text formatting portion 312 so as not to exceed a designated area of the display 302. The dot data generating portion 314 converts the text data that has been formatted into dot data. The text data converted into the dot data is displayed on the display 302. The control relating to such display is integrally managed by the display operation control portion 311.

Meanwhile, the text analyzing portion 322 converts the text data of the work 301 into pronunciation codes by making reference to the word dictionary 323. The voice synthesizing portion 325 converts the pronunciation codes obtained after conversion into voice waveforms by making reference to the voice data storing portion 324 and outputs them as voice signals from the speaker 305.

Although one text set is shown on the display screen and that text set is read out in this example, Japanese Patent Applications Laid-open Nos. 61-84689 and 6-19433 disclose text reading apparatuses that display a plurality of text sets on the display screen and read a selected one of these text sets.

FIG. 18 shows an example of the display screen in the text reading apparatus that displays a plurality of text sets and reads out one of them. Different text sets are displayed in first and second display areas 332 and 333 provided on the display screen 331. The respective display areas 332 and 333 are divided into title display areas 335 and 336 for displaying a title of each work and text display areas 337 and 338 in which the content of the text set is displayed, respectively. In the title display areas 335 and 336 are displayed play/pause buttons 338 and 339 used to start or pause reading the text set, stop buttons 341 and 342 used to stop reading the text set, as well as titles of the works.

FIG. 19 shows the title display area when reading of the text set is paused. "TODAY'S MENU" is displayed as a title of the work in the title display area 335. Further, the play/pause button 338 has the appearance of a play button for canceling pause to restart the voice output.

FIG. 20 shows the title display area when the text set is being read out. In this case, the play/pause button 338 has the appearance of a pause button for interrupting the play.

When reading of the text set is stopped or paused, the display shown in FIG. 19 appears. At this stage, when the play/pause button 338 is pointed to and clicked by a pointing device such as a mouse, the text set of the work whose title is displayed is read out and the play/pause button 338 is changed as shown in FIG. 20. In the play mode shown in FIG. 20, when the play/pause button 338 is pointed to and clicked by the mouse, reading of the text set is paused and the button 338 is changed as shown in FIG. 19. When the stop buttons 341 and 342 are clicked, reading of the text set is stopped.

By displaying the title of the work in this manner, the text set displayed on the display can be readily identified in accordance with each work. Reading of the displayed text set is easily initiated by using the buttons for the reading operation.

In the conventionally-used text reading apparatus for displaying a plurality of text sets on one display screen, the reading operation is independently carried out in accordance with the text set in each display area, making it possible for a plurality of the text sets to be simultaneously read. Clearly, listeners can not discriminate a plurality of text sets which are simultaneously output. Operators must therefore operate the apparatus so that a plurality of text sets are not simultaneously read out, which leads to deteriorated operability. In addition, since the reading operation is controlled from within each display area, the exclusive operation cannot be guaranteed by the apparatus. Moreover, it is difficult to determine from the display screen, which text set is being read out, and operations such as changing the text set to be read out thus become troublesome.

It is therefore an object of the present invention to provide a text reading apparatus, a text reading method, and a computer-readable medium storing a text reading program, which make operation easy and by which two or more text sets are not simultaneously read.

SUMMARY OF THE INVENTION

A first text reading apparatus in accordance with the present invention comprises:

at least one display means, each of said at least one display means displaying a respective text set on a display screen;

a selecting means for selecting one of said displayed text sets to be read out, when requested to select said text set while no other text set is being read out; and a reading means for reading out said selected text set.

A second text reading apparatus in accordance with the present invention further comprises:

a title display means for displaying a title of said selected text set.

In a third text reading apparatus in accordance with the present invention:

said title display means further displays information indicating a reading status of said selected text set, wherein said status is one of play, pause and stop; and said selecting means selects one of said displayed text sets, whose title is not being displayed by said title display means, to be read out, when requested to select said text set while the reading of said selected text set is in the stop status.

A first text reading method in accordance with the present invention comprises:

selecting one of at least one text set displayed on a display screen to be read out; and reading out said selected text set.

A second text reading method in accordance with the present invention further comprises:

displaying a title of said selected text set.

In a third text reading method in accordance with the present invention:

said displaying step further comprises displaying information indicating a reading status of said selected text set, wherein said status is one of play, pause and stop; and said selecting step further comprises selecting one of said at least one displayed text set, whose title is not being displayed in said displaying step, to be read out, when requested to select said text set while the reading of said selected text set is in the stop status.

A first computer-readable medium in accordance with the present invention comprises:

a computer-readable data storage device;

a text reading program stored on said device, said program comprising:

a first program portion causing a computer to select one of at least one text set displayed on a display screen to be read out; and a second program portion causing the computer to read out said selected text set.

A second computer-readable medium in accordance with the present invention further comprises:

a third program portion causing the computer to display a title of said selected text set.

In a third computer-readable medium in accordance with the present invention:

said third program portion further comprises a program portion causing the computer to display information indicating a reading status of said selected text set, wherein said status is one of play, pause and stop; and said first program portion further comprises a program portion causing the computer to select one of said at least one displayed text set, whose title is not being displayed in said displaying step, to be read out, when requested to select said text set while the reading of said selected text set is in the stop status.

DETAILED DESCRIPTION OF THE PREFERRED EMBODIMENTS

Figure 1:
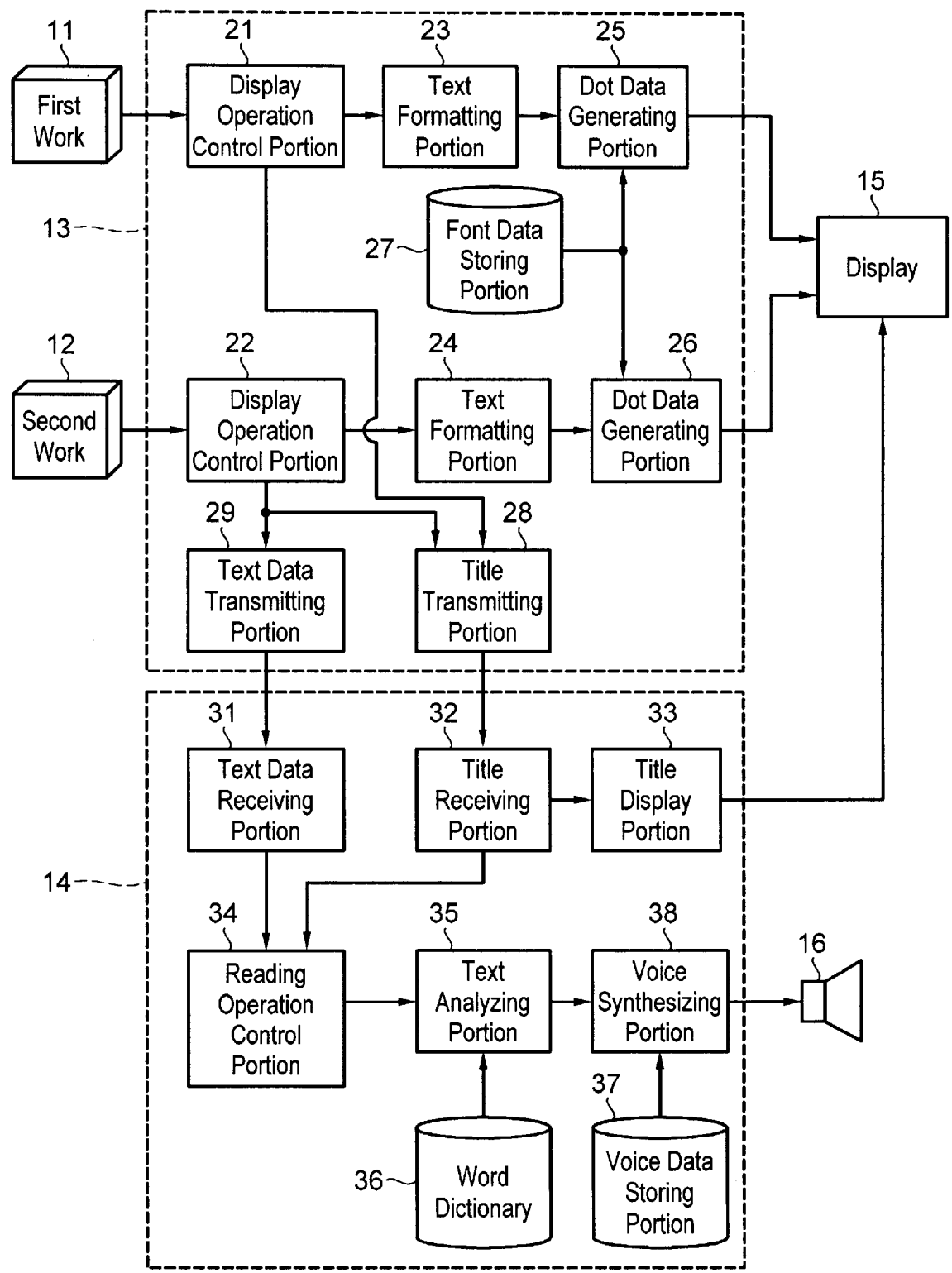
FIG. 1 is a block diagram showing an outline of the structure of a text reading apparatus in one embodiment according to the present invention.

FIG. 1 shows an outline of a structure of a text reading apparatus in one embodiment according to the present invention. This apparatus is made up of a display control portion 13 for displaying first and second works 11 and 12, which are particular text sets, a reading portion 14 for reading either of these works, a display 15 and a speaker 16. The display control portion 13 is provided with display operation control portions 21 and 22 for integrally managing display control in accordance with each work, text formatting portions 23 and 24 for formatting the text set so that it fits in a predetermined display area, and dot data generating portions 25 and 26 for converting text data into dot data.

The display portion is further provided with a font data storing portion 27 storing dot data in accordance with each word to which reference is made when converting the text data into dot data. Moreover, it includes a title transmitting portion 28 for informing the reading portion 14 of a title of the work which is selected to be read out and a text data transmitting portion 29 for transmitting to the reading portion 14 the text data of the work to be read out in response to a request from the reading portion 14.

The reading portion 14 is provided with a text data receiving portion 31 for receiving the text data from the text data transmitting portion 29, a title receiving portion 32 for receiving a title of the work from the title transmitting portion 28, and a title display portion 33 for displaying a title of the work to be read out in a predetermined area of the display 15. The reading portion 14 also includes a reading operation control portion 34 for managing the entire reading control, a text analyzing portion 35 for analyzing the text data to be converted into pronunciation codes, and a word dictionary 36 storing each word to which reference is made during analysis. Furthermore, the reading portion is provided with a voice data storing portion 37 storing pronunciation codes and voice waveforms in coordinating manner, and a voice synthesizing portion 38 for converting pronunciation codes into voice waveforms.

Display of the first and second works 11 and 12 is independently controlled in accordance with each work by the display control portions 21 and 22. On the other hand, with respect to reading out the work, one reading portion 14 is provided with respect to the two works and only one of a plurality of the works is read out.

The text data of each work is formatted by the text formatting portion 23 or 24 so that it does not exceed each display area. The dot data generation portions 25 and 26 converts the formatted text data into dot data by making reference to the font data storing portion 27. The text sets of the respective works that have been converted into the dot data are displayed in different areas on the display 15. Either the first work 11 or the second work 12, which is selected, is read out. The text analyzing portion 35 converts the text data of the work that is selected into pronunciation codes by making reference to the word dictionary 36. The voice synthesizing portion 38 converts the pronunciation codes into voice waveforms by making reference to the voice data storing portion 37. Upon conversion, the voice waveforms are output as voice from the speaker 16, whereby the text set is read out.

When reading out the text set, the text data receiving portion 31 transmits to the display operation control portions controlling the work that is selected to be read out a request for sending a predetermined amount of the text data. Of the display operation control portions 21 and 22 that have received the request, one managing the text set which is requested to be sent transmits the corresponding text data from the text data transmitting portion 29. The sent text data is received by the text data receiving portion 31 and converted into voice to be read out according to the above-described procedure.

When the work which is selected to be read out is changed, the title thereof is transmitted from the title transmitting portion 28 to the title receiving portion 32 of the reading portion 14. When the title is received, the title receiving portion 32 sets the received title as a title of a new work to be read out if no other work is selected or if the reading operation is stopped. On the other hand, the work is not changed if another work is being read out or if the reading operation is paused when the title is received.

Figure 2:
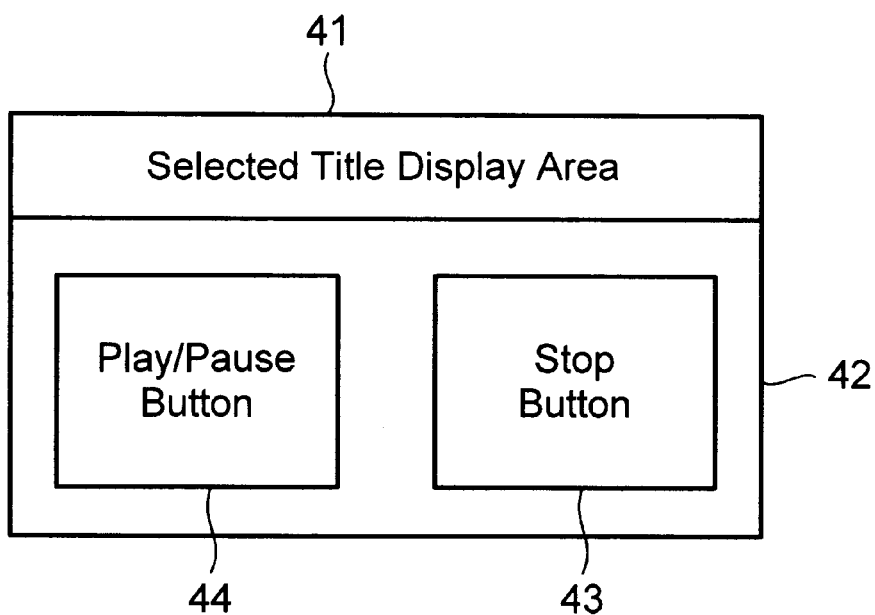
FIG. 2 is an explanatory view showing an example of the operation screen for reading displayed in a part of the display.

FIG. 2 illustrates an example of an operation screen for reading that is displayed in a part of the display. The operation screen for reading is constituted by a selected title display area 41 that displays a title of the work that is selected to be read out and an operation button area 42 for directing the reading operation using a mouse. In the operation button area 42, a stop button 43 for forcibly stopping reading and a play/pause button 44 for inputting a command to pause or start play are displayed. The play/pause button 44 has the appearance of a pause button when the text set is being read out or a play button when reading of the text set is stopped or paused.

Figure 3:
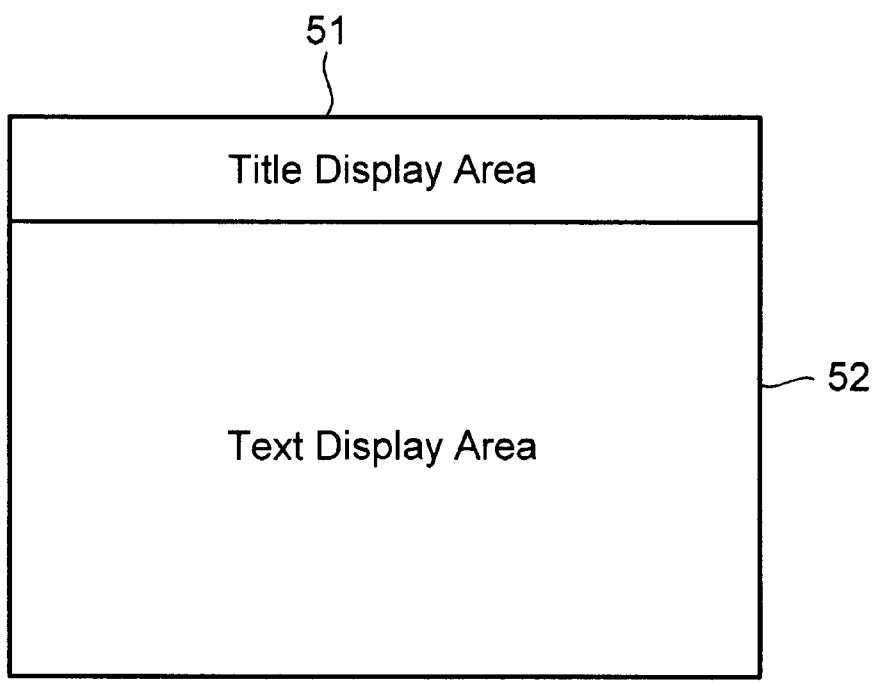
FIG. 3 is an explanatory view showing an example of a display screen of the text set displayed in a part of the display.

FIG. 3 shows an example of a display screen for the text set that is displayed in a part of the display. The display screen for the text set is composed of a title display area 51 for displaying a title and a text display area 52 for displaying the text set. Multiple display screens for the text sets are displayed on the display 15 corresponding to the number of text sets that are simultaneously displayed. On the other hand, only one operation screen for reading shown in FIG. 2 is displayed on the display irrespective of the number of display screens for the text sets.

If the work that is selected to be read out is changed while reading of the text set is stopped, the title displayed in the selected title display area 41 is changed to the title of the newly selected work. When the text set is being read or reading is paused, the title in the selected title display area 41 is not changed even if the title that is selected to be read out is changed. If the play/pause button 43 is pressed when reading of the text set is stopped, the work whose title is displayed in the selected title display area 41 is read out. If the play/pause button 43 is pressed during pause, reading of the paused work, i.e., the work whose title is displayed in the selected title display area 41, is restarted. Pressing the stop button during reading the text set or during pause stops reading, and the title of the work that is selected to be read can be changed.

Figure 4:
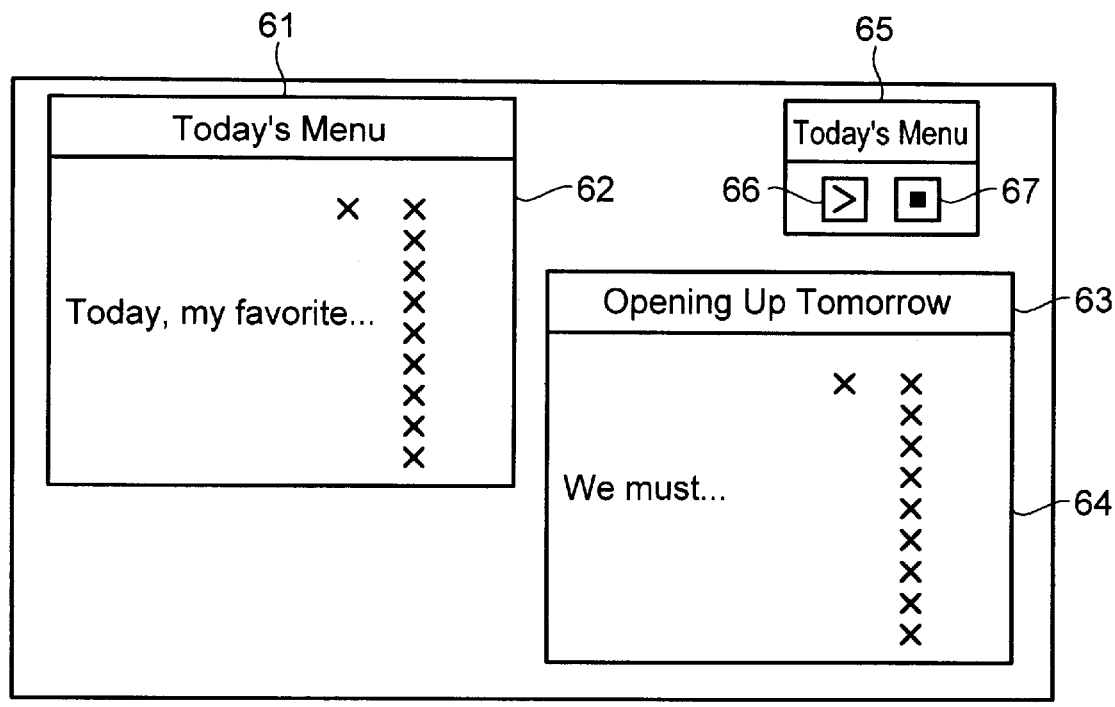
FIG. 4 is an explanatory view showing an example of a display screen on the display when displaying two text sets.

FIG. 4 shows an example of the display screen when two text sets are displayed. "TODAY'S MENU" is displayed as a title in a title display area 61 in the first display screen for the text set and the content of the corresponding text set is displayed in a text display area 62. Further, in a title display area 63 in the second display screen for the text set is displayed "OPENING UP TOMORROW" as a title, and its content is displayed in the text display area 64. "TODAY'S MENU" is displayed as a title of the work which is selected to be read out is displayed in a selected title display area 65 in the display screen for reading. A play/pause button 66 and a stop button 67 are displayed in the operation button area.

Figures 5, 6:
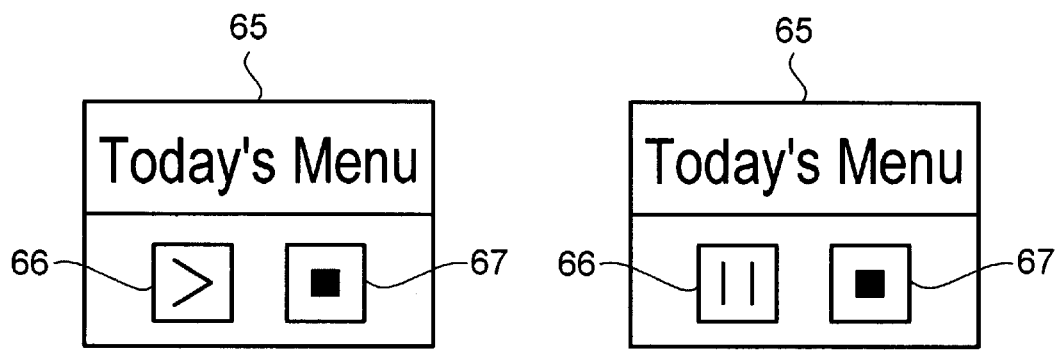
FIG. 5 is an explanatory view showing a screen displayed when reading of the text set is stopped or paused.
FIG. 6 is an explanatory view showing a screen displayed when reading out the text set.

FIG. 5 illustrates the display screen for reading when reading of the text set is stopped or paused. A right arrow is displayed in the play/pause button 66. Here, the play/pause button 66 has the appearance of a play button for inputting a command to start play.

FIG. 6 shows the display screen for reading when the text set is read out. Two vertical lines are displayed in the play/pause button 66. Here, the play/pause button 66 has the appearance of a pause button for inputting a command to pause the reading operation. In the display state shown in FIG. 5, when the work having the title "OPENING UP TOMORROW" is selected to be read out, the content displayed in the selected title display area 65 is changed to "OPENING UP TOMORROW." Meanwhile, the content displayed in the selected title display area 65 is not changed and "TODAY'S MENU" is displayed without modification, even if the work having the title "OPENING UP TOMORROW" is selected in the display state shown in FIG. 6. In this manner, a change of the work which is selected to be read out is accepted only when the reading operation is stopped.

Figure 7:
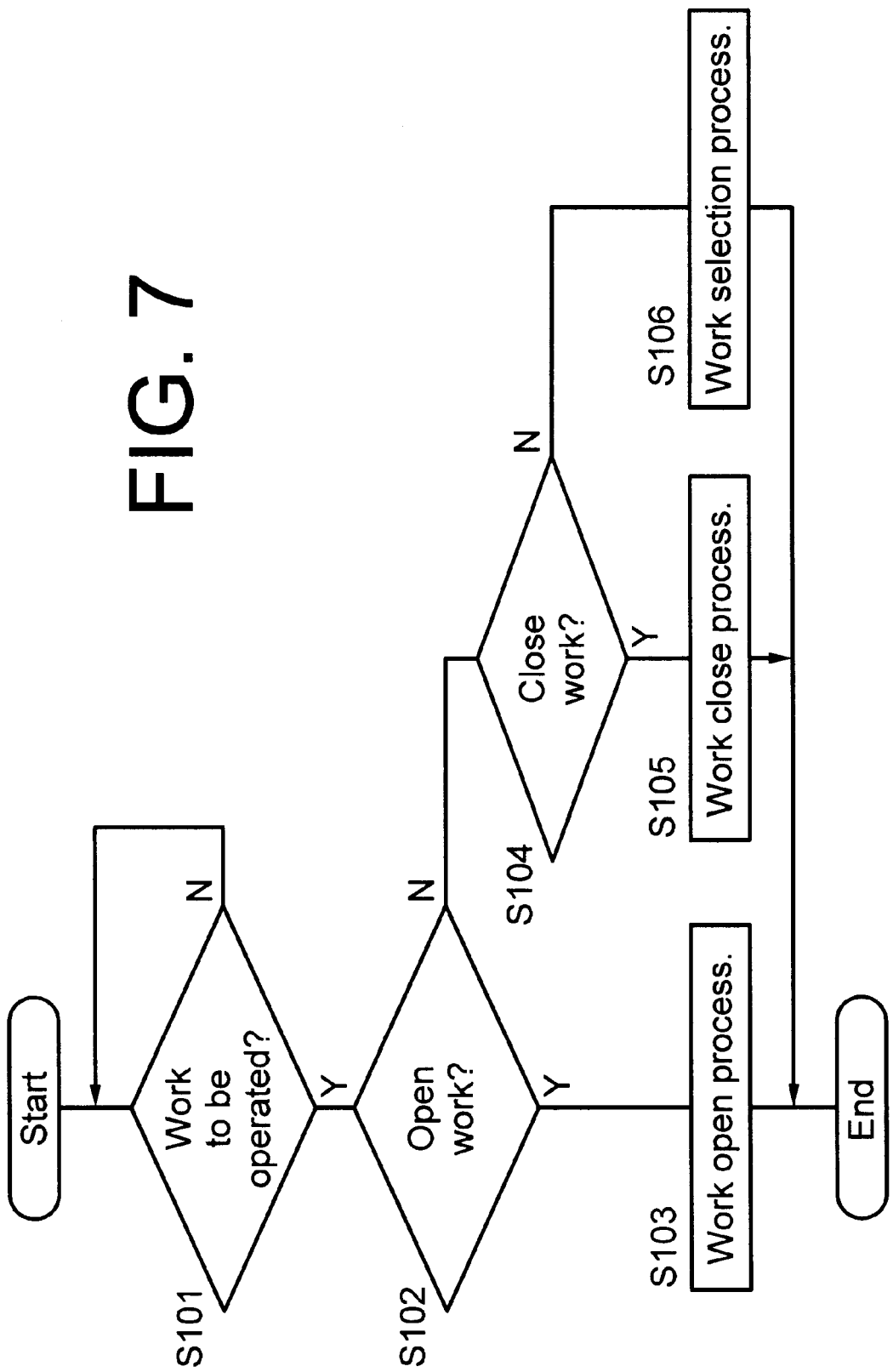
FIG. 7 is a flowchart showing a flow of the process performed by the display control portion.

FIG. 7 illustrates a flow of the process performed by the display control portion. The description will be given as to the case where the first work 11 is read out. When any command is input from a non-illustrated mouse, the display control portion determines whether the input command is to operate the work or not (step S101). If that command is to operate the work (step S101; Y), confirmation is made based upon whether the command is to open another work (step S102).

If the command is to open another work (step S102; Y), the work open process for displaying another work on the display screen is carried out (step S103). If the command for operating the work is to close the work (step S104; Y), the work close process for terminating display of the specified work is performed (step S105). When the command is to neither open nor close the work (step S104; N), the command is restricted to selection of a work. Therefore, the work selection process is effected here (step S106). The process shown in FIG. 7 repeatedly continues.

Figure 8:
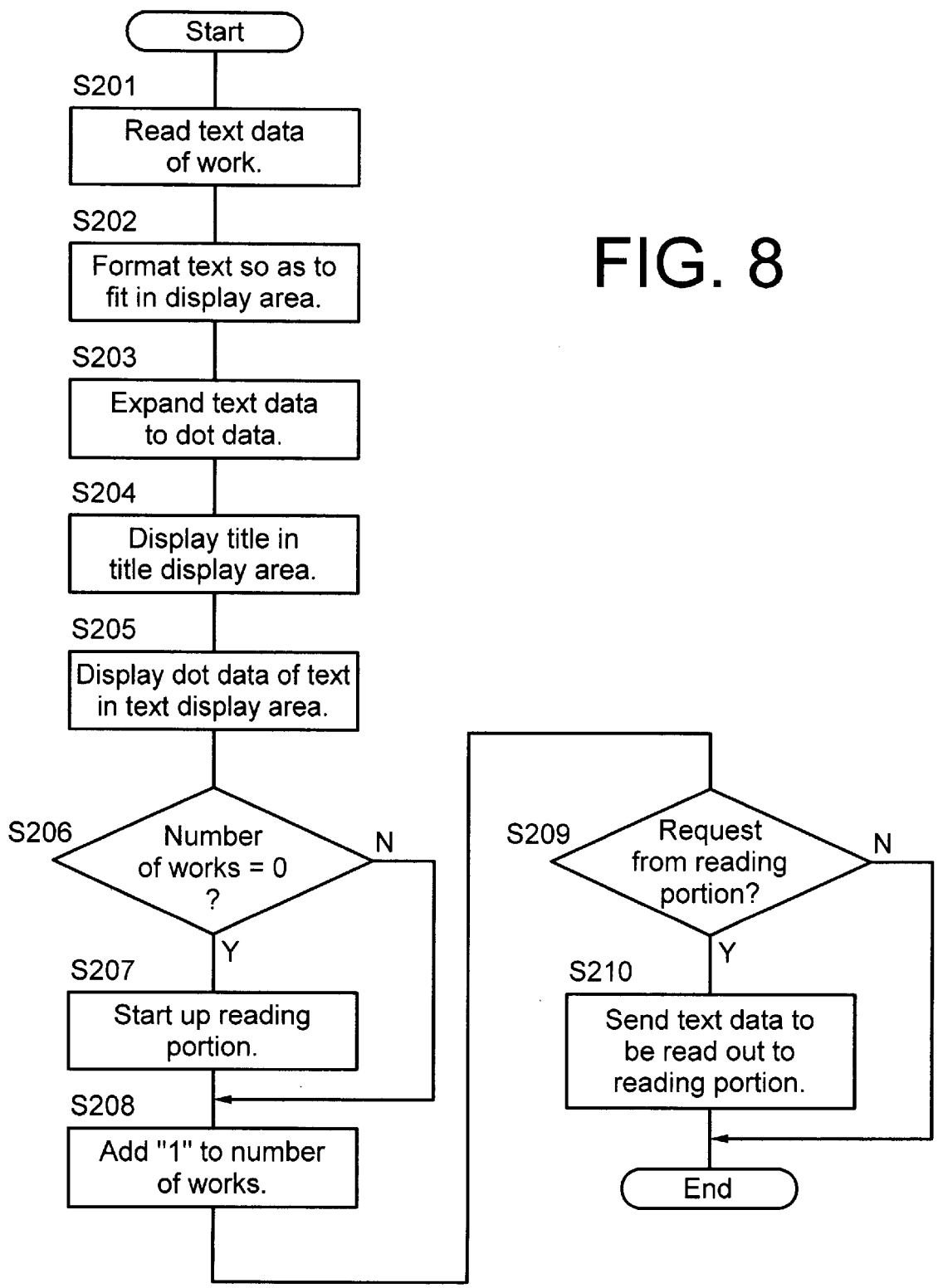
FIG. 8 is a flowchart showing a flow of the work opening process illustrated in FIG. 7.

FIG. 8 shows a flow of the work open process illustrated in FIG. 7. The text data of the corresponding work is first read (step S201), and the text set is formatted in the text formatting portion 23 so that it does not exceed the text display area 52 shown in FIG. 3 (step S202). The dot data generating portion 25 converts the formatted text set into dot data by making reference to the font data (step S203). A title of that work is then displayed in the title display area (step S204). Subsequently, the text set expanded into dot data is displayed in the text display area (step S205).

Confirmation is then made based upon whether the number of works, that is a variable representing the number of works displayed in the display 15, is "0" (step S206). If the number of works is "0", there is no work displayed in the display 15 at the current time except the work to be opened, and start of the reading portion 14 is yet to be carried out. If the number of works is "0" (step S206; Y), the reading portion 14 is started (step S207).

If the number of works is not "0" (step S206; N), the reading portion 14 has been already started when opening another work, and the reading portion 14 is not therefore started up. Thereafter, "1" is added to the number of works (step S208). Since another work is displayed, the reading portion 14 is informed of a title of that work. Determination of whether the informed title is set for the work that is selected to be read out depends on the operation state of the reading portion 14 at that time, as described above.

When the reading portion 14 is reading out any text set, a request for sending the text data is transmitted from the reading portion 14. The display control portion therefore confirms whether a request for sending the text data has arrived (step S209). When the request for sending has arrived (step S209; Y), the text data that is to be read out is transmitted to the reading portion 14 (step S210). When the request for sending has not arrived (step S209; N), the work open process is terminated (END).

Figure 9:
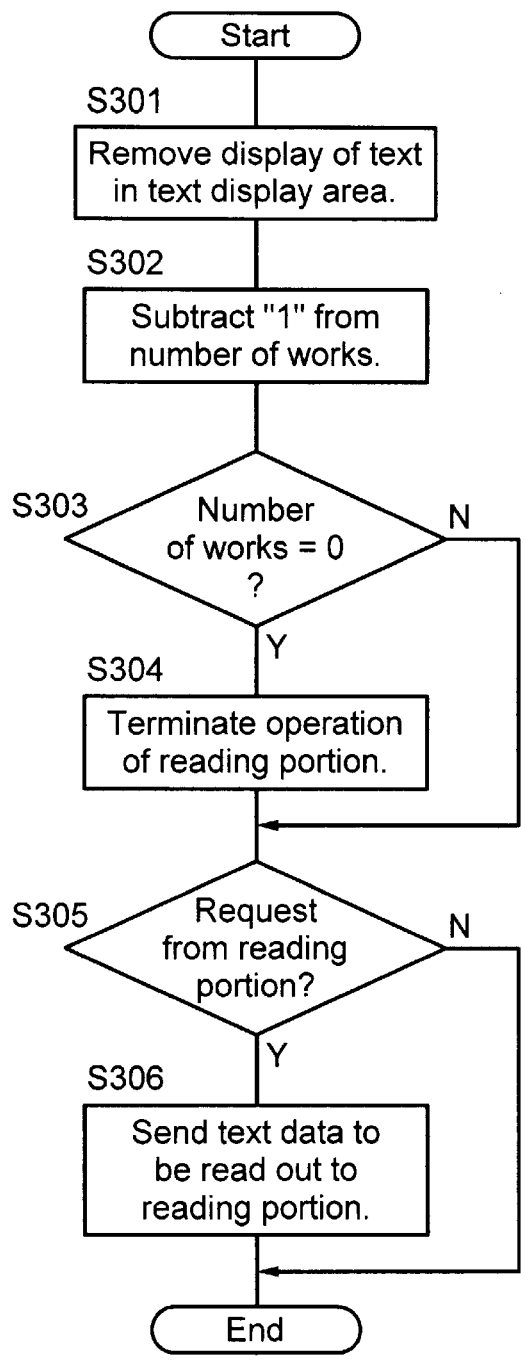
FIG. 9 is a flowchart showing a flow of the work closing process illustrated in FIG. 7.

FIG. 9 shows a flow of the work close process illustrated in FIG. 7. In the work close process, the displayed content in the text display area in which the corresponding work is displayed is cleared (step S301), and only "1" is then subtracted from the number of works (step S302). If the number of works after subtraction becomes "0" (step S303; Y), the operation of the reading portion 14 is terminated (step S304). Here, any other work may possibly be opened still, and confirmation is thus made based upon whether the request for sending the text data has arrived from the reading portion (step S305). When the request for sending has arrived (step S305; Y), the text data that is to be read out is sent to the reading portion (step S306). If the request for sending has not arrived (step S305; N), the work close process is terminated (END).

Figure 10:
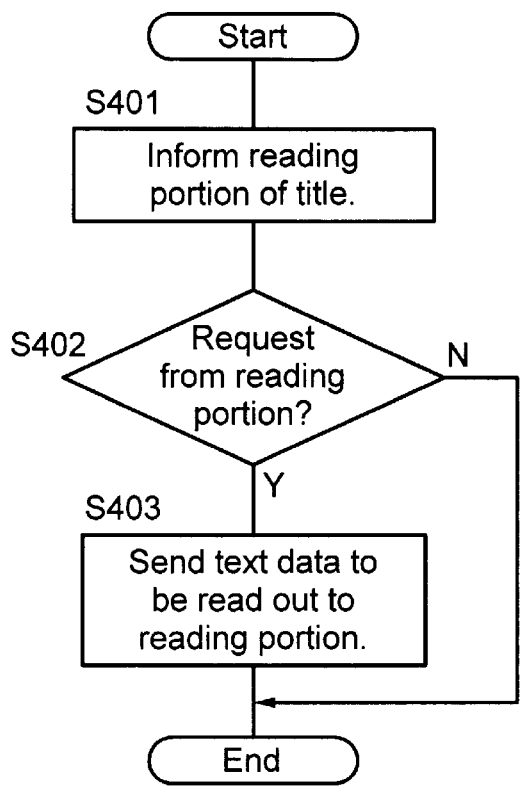
FIG. 10 is a flowchart showing a flow of the work selection process illustrated in FIG. 7.

FIG. 10 illustrates a flow of the work selection process shown in FIG. 7. In the work selection process, the reading portion 14 is first informed of a title of a selected work through the title transmitting portion 28 (step S401). Confirmation is thereafter made based upon whether the request for sending the text data has arrived from the reading portion 14 (step S402). When the request for transmission has arrived (step S402; Y), the text data which is to be read out is sent to the reading portion (step S403). When the request for transmission has not arrived (step S402; N), the work selection process is terminated (END).

Figure 11:
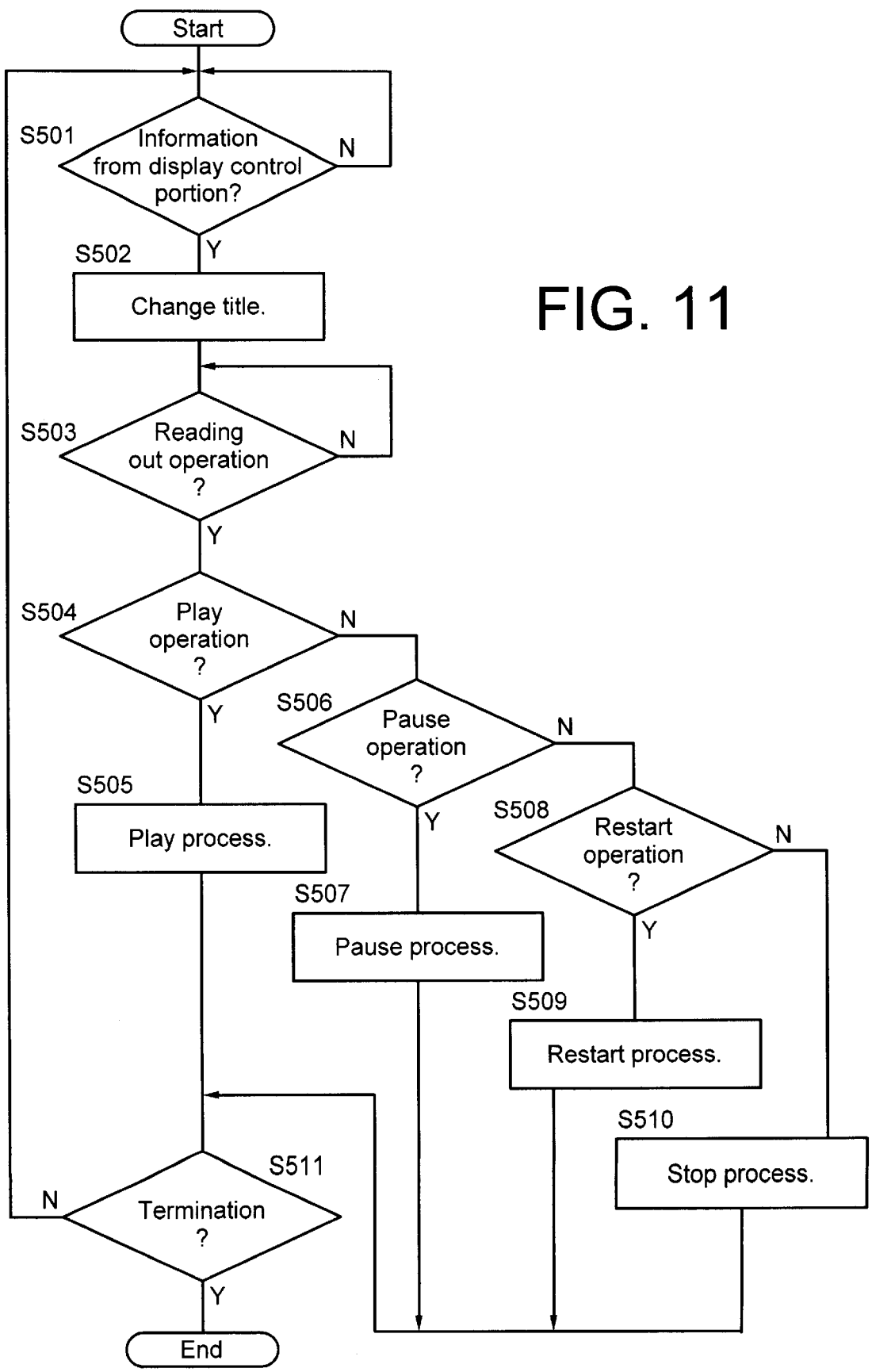
FIG. 11 is a flowchart showing a flow of the process carried out by the reading portion.

FIG. 11 show a flow of the process carried out by the reading portion. The reading portion 14 judges whether information of a title has arrived from the display control portion (step S501) and performs the process to change a title in accordance with the operation state of the reading portion 14 at the time when it is informed of the title (step S502). The reading portion then waits for input of any command from the operation button in the display screen for reading (step S503).

When the reading operation is effected (step S503; Y), judgment is made based upon a content of the operation (step S504; Y). When the content of the operation is the play operation (step S504; Y), the play process is executed (step S505); when it is the pause operation (step S506; Y), the pause process (step S507) is effected. Further, when the content of the operation is the restart operation, (step S508; Y), the restart process (step S509) is carried out; when it is the stop operation (step S508; N), the stop process (step S510) is performed. When the operation of the reading process is not terminated (step S511; N), the control returns to the step S501 to repeat these processes.

Figure 12:
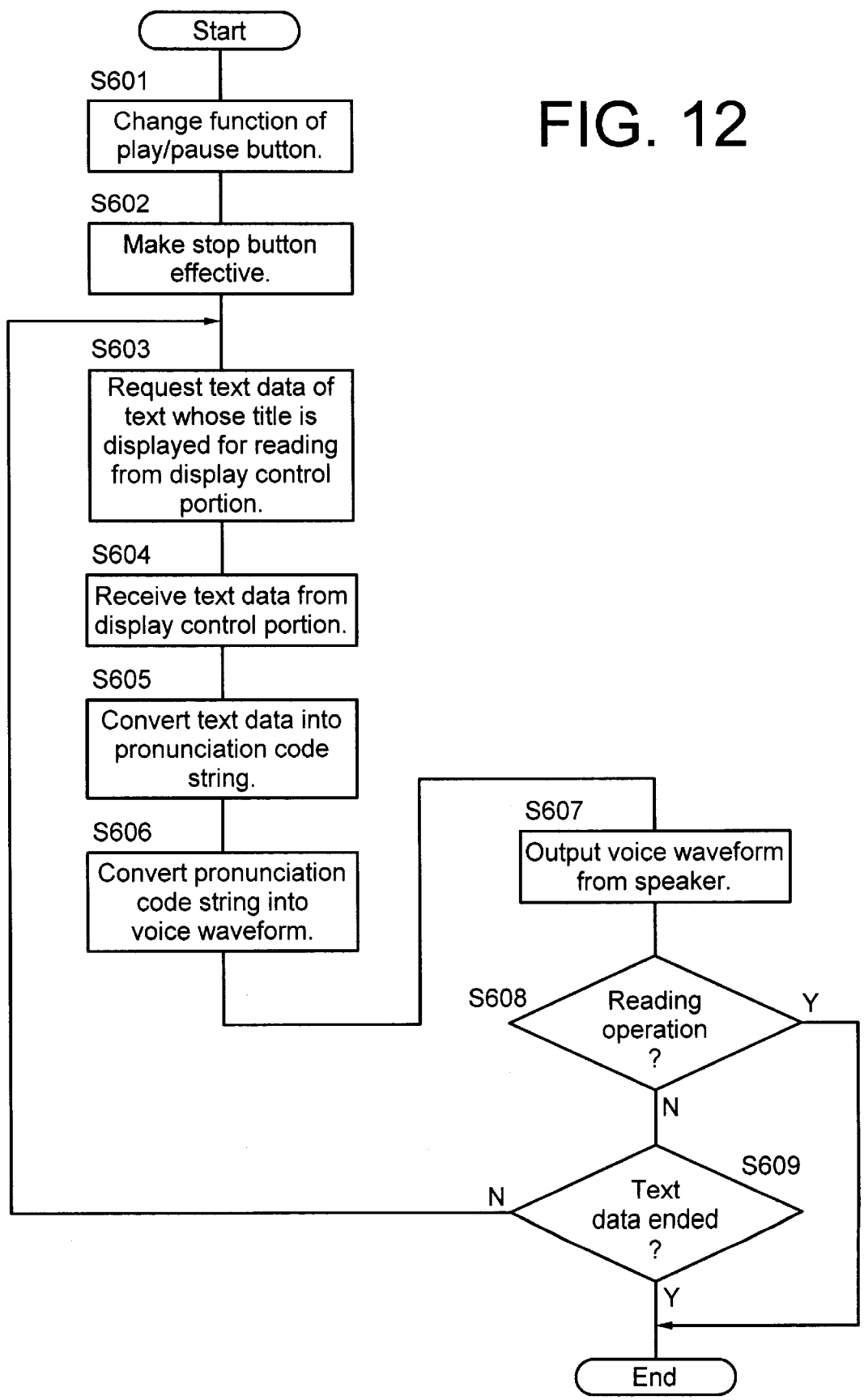
FIG. 12 is a flowchart showing a flow of the play process illustrated in FIG. 11.

FIG. 12 shows a flow of the play process shown in FIG. 11. Since the apparatus enters the play mode, the function of the play/pause button is changed to function as the pause button (step S601), and this function is made effective (step S602) so that the pausing operation can be accepted. A request for sending the text data of the work which is to be read out and whose title is currently displayed in the selected title display area is then transmitted from the text data receiving portion 31 to the display control portion (step S603). The text data fed from the text data transmitting portion 29 is received in accordance with the request for sending (step S604). The text analyzing portion 35 converts the received data into a pronunciation code string by making reference to the word dictionary 36 (step S605).

The voice synthesizing portion 38 converts each pronunciation signal into a corresponding voice waveform by consulting the voice data storing portion 37 (step S606) and outputs a result from the speaker (step S607). Subsequently, judgment is made based upon whether any other reading operation such as pausing or stopping has been carried out (step S608) and, if any other operation has been performed (step S608; Y), the play process is terminated. If any other operation has not been performed (step S608; N), judgment is made based upon whether the current work has been read through (step S609). If reading of the text set is not completed (step S609; N), the control returns to the step S603 and a request for sending the next text data is transmitted to the display control portion. If reading through the text set is finished (step S609; Y), the play process is terminated (END).

Figure 13:
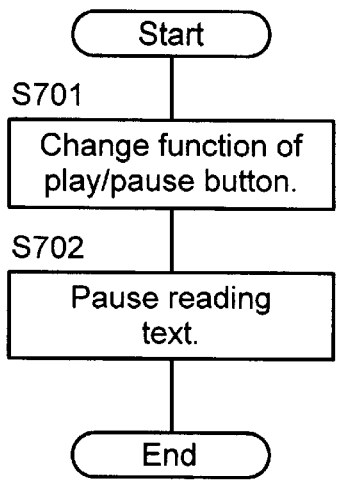
FIG. 13 is a flowchart showing a flow of the pause process illustrated in FIG. 11.

FIG. 13 shows a flow of the pause process illustrated in FIG. 11. In the first place, the function of the play/pause button is changed to function as the play button (step S701), and the pause mode is changed so that a direction for restarting the play is acceptable. Thereafter, reading of the text set is paused (step S702).

Figure 14:
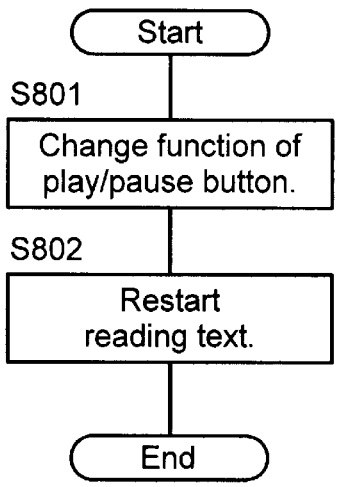
FIG. 14 is a flowchart showing a flow of the restart process illustrated in FIG. 11.

FIG. 14 illustrates a flow of the restart process shown in FIG. 11. The function of the play/pause button is first changed to function as the pause button (step S801), and the play mode is changed so that a direction for pausing is acceptable. Then, reading of the text set is restarted (step S802).

Figure 15:
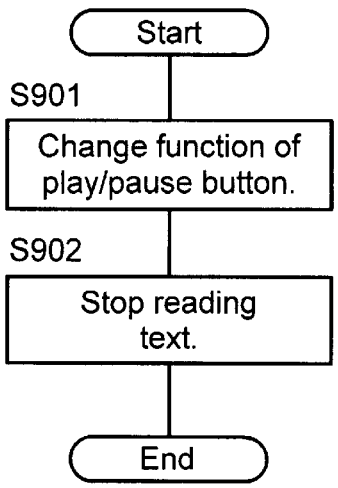
FIG. 15 is a flowchart showing a flow of the stop process illustrated in FIG. 11.

FIG. 15 shows a flow of the stop process illustrated in FIG. 11. The function of the play/pause button is changed to function as the play button (step S901). Reading of the text set is then stopped (step S902).

Figure 16:
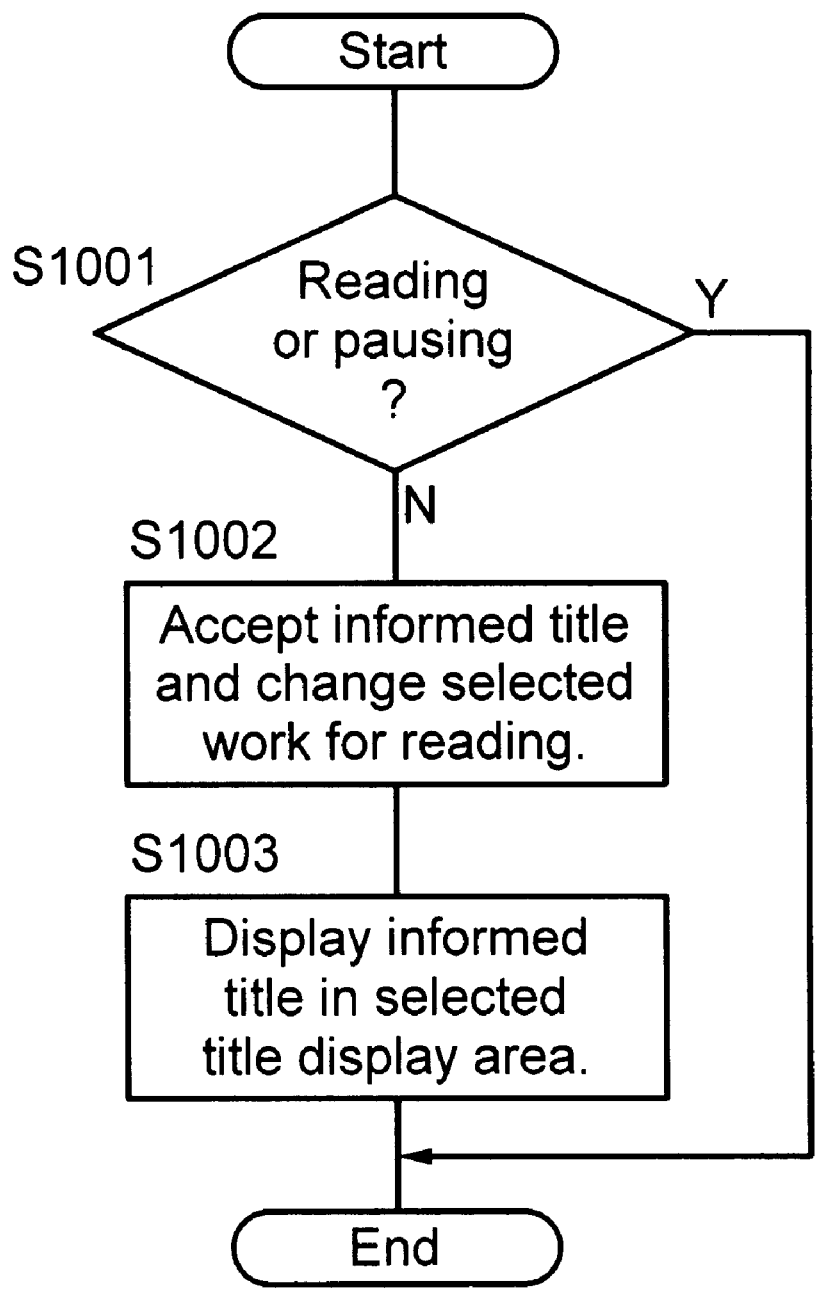
FIG. 16 is a flowchart showing a flow of the title change process illustrated in FIG. 11.
Figure 17:
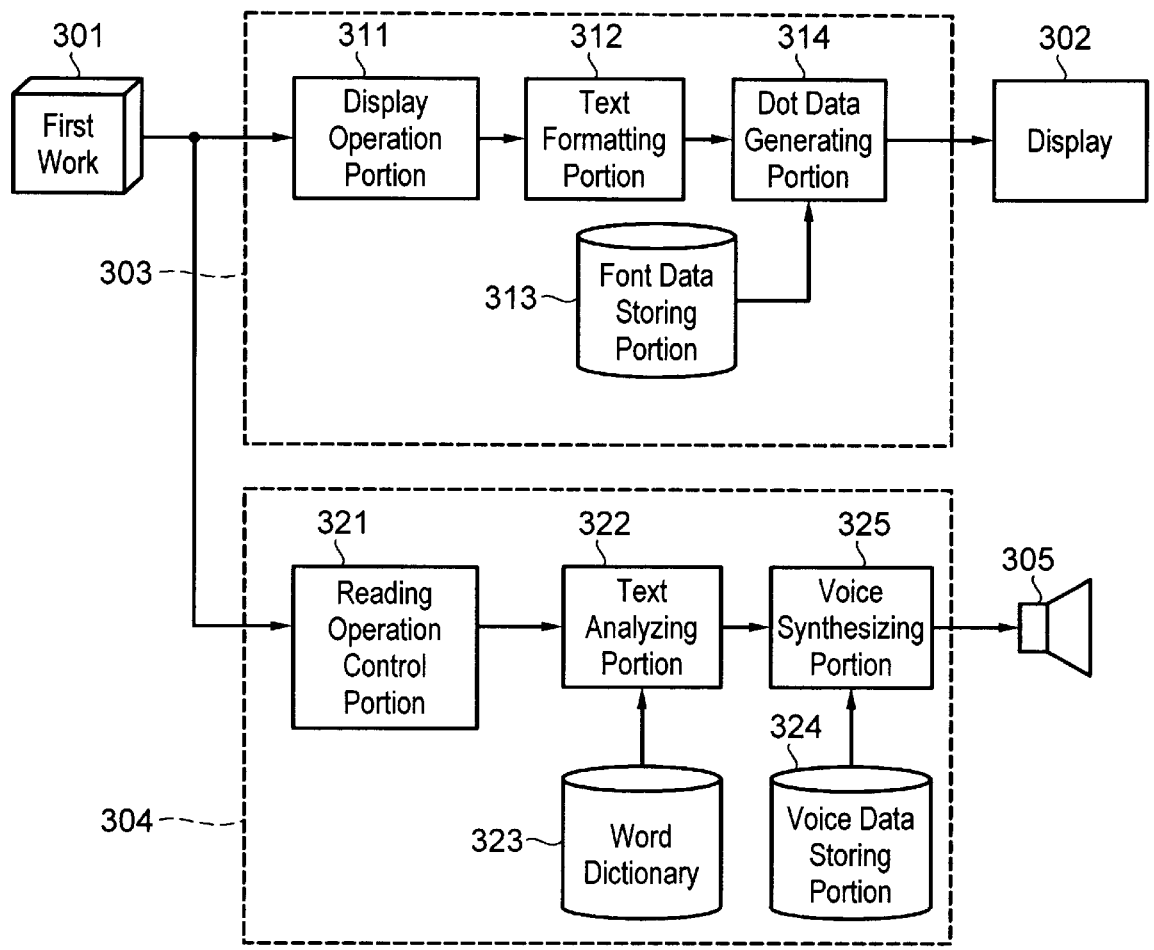
FIG. 17 is a block diagram showing an outline of the structure of a conventionally-used text reading apparatus for reading out a displayed text set.
Figure 18:
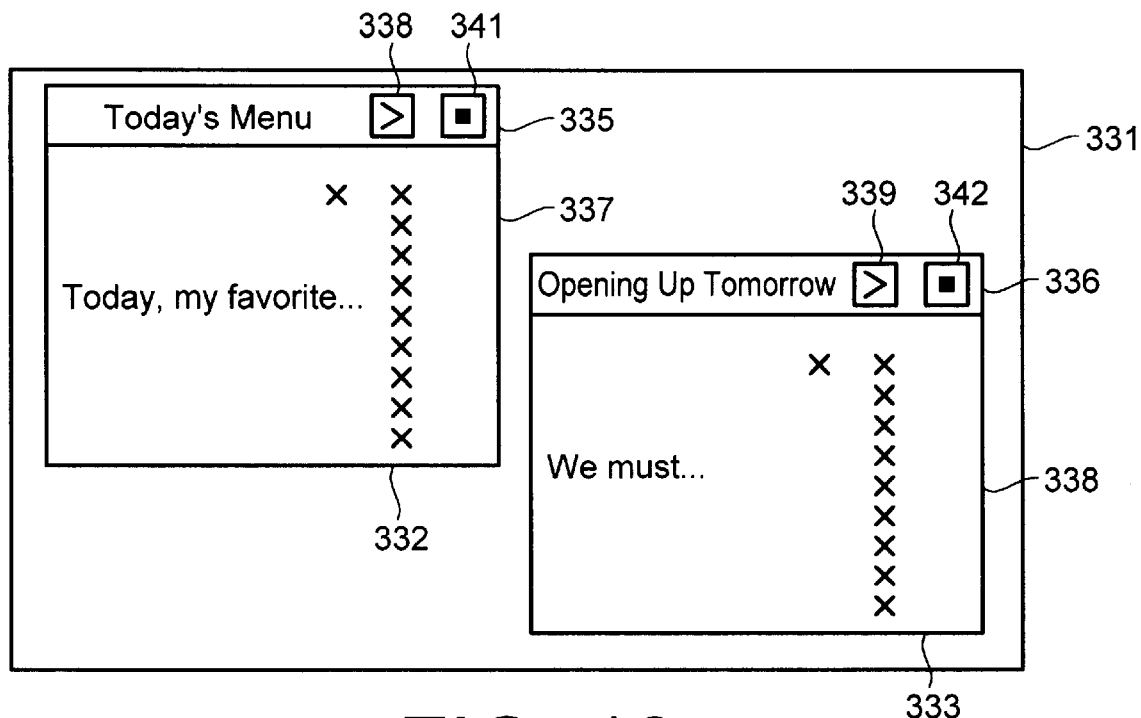
FIG. 18 is an explanatory view showing an example of the display screen in the text reading apparatus for displaying a plurality of text sets to be read out.
Figure 19:
FIG. 19 is an explanatory view showing the contents of the title display area when reading of the text set is paused.
Figure 20:
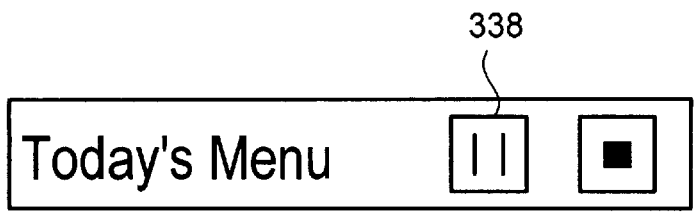
FIG. 20 is an explanatory view showing the contents of the title display area while the text set is being read out.

FIG. 16 shows a flow of the title changing process illustrated in FIG. 11. When changing the work that is selected to be read out, judgment is made based upon whether the reading portion is currently reading out the work or pausing the operation for reading the work (step S1001). If the work is being read out or reading of the work is paused (step S1001; Y), the title of the work selected to be read out is not changed. If the work is not being read out and reading of the work is not paused (step S1001; N), the title provided by the display control portion is accepted as a work that is now to be read (step S1002). Moreover, the content of display in the selected title display area is changed to the newly-accepted title (step S1003).

In the embodiment described above, two works are simultaneously displayed, but there is no set limit on the number. Also, the display control portion and the reading portion may be constituted by respective programs. That is, the environment enabling the multitask is achieved, and a plurality of display programs for displaying each work are simultaneously activated. By doing so, a plurality of works are simultaneously shown on the display. Meanwhile, only one program for reading out the text set is started up. Information of the title from the display programs is accepted only when the selected program stops reading the text set. As a result, the above-mentioned operation can be performed.

Thus, according to the present invention, at least one display means for displaying text set on the display screen and one reading means for reading out a text set are prepared so that a change of a selected text set can be accepted only when the text set is not being read out. Consequently, the exclusive control that prohibits reading out one text set when reading out any other text set can be readily carried out.

Also, since the title of the text set that is selected to be read out is displayed on the display screen, it is possible to easily identify which among a plurality of displayed text sets is being read out.

In addition, according to the present invention, pausing the operation for reading out the text set is enabled, and a change of the text set that is selected to be read out is rejected during pause of reading. Pause means that one may choose to restart reading, and it is thus possible to provide the operation that reflects such a choice by preventing the text set which is being read from being changed during pause.

What is claimed is:

1. A text-to-voice reading apparatus, comprising:
   at least one display means, each of said at least one display means displaying one or more text sets on a display screen;
   a selecting means for selecting one of said displayed text sets to be read out, said selecting means preventing read out of said text set and allowing the display of said text set on said display screen while another text set is being read out; and
   a reading means for reading out said selected text set as synthesized speech.

2. The text-to-voice reading apparatus as claimed in claim 1, further comprising:
   a title display means for displaying a title of said selected text set when read out of said selected text set is effected.

3. The text-to-voice reading apparatus as claimed in claim 2, wherein:
   said title display means further displays information indicating a reading status of said selected text set, wherein said status is one of play, pause and stop; and
   said selecting means selects one of said displayed text sets, whose title is not being displayed by said title display means, to be read out, when requested to select said text set while the reading of said selected text set is in the stop status.

4. The text-to-voice reading apparatus as claimed in claim 3, wherein:
   each of said at least one display means removes said displayed text set from the display screen when requested to close said displayed text set, and displays said removed text set on the display screen when requested to open said removed text set.

5. The text-to-voice reading apparatus as claimed in claim 4, wherein:
   said selecting means terminates said reading means, upon closing said displayed text set when no other text set is being displayed, and starts said reading means, upon opening said removed text set when no other text is being displayed.

6. A text-to-voice reading method, comprising:
   selecting one of plural text sets displayed on at least one display screen to be read out;
   reading out said selected text set; and
   preventing read out of any other of said plural text sets and allowing the display of any other of said text sets on said display screen while said selected text set is being read out.

7. The text-to-voice reading method as claimed in claim 6, further comprising:
   displaying a title of said selected text set during read out of said selected text set.

8. The text-to-voice reading method as claimed in claim 7, wherein:
   said displaying step further comprises displaying information indicating a reading status of said selected text set, wherein said status is one of play, pause and stop; and
   said selecting step further comprises selecting one of said at least one displayed text set, whose title is not being displayed in said displaying step, to be read out, when requested to select said text set while the reading of said selected text set is in the stop status.

9. A computer-readable medium, comprising:

a computer-readable data storage device;

a text reading program stored on said device, said program comprising:

a first program portion causing a computer to select one of plural text sets displayed on at least one display screen to be read out;

a second program portion causing the computer to read out said selected text set; and a third program portion preventing read out of any other of said plural text sets and allowing the display of any other of said text sets on said display screen while said selected text set is being read out.

10. The computer-readable medium as claimed in claim 9, further comprising:

a fourth program portion causing the computer to display a title of said selected text set.

11. The computer-readable medium as claimed in claim 10, wherein:

said fourth program portion further comprises a program portion causing the computer to display information indicating a reading status of said selected text set, wherein said status is one of play, pause and stop; and said first program portion further comprises a program portion causing the computer to select one of said at least one displayed text set, whose title is not being displayed in said displaying step, to be read out, when requested to select said text set while the reading of said selected text set is in the stop status.

* * * * *